United States Patent [19]

Bergman

[11] Patent Number: 4,770,198

[45] Date of Patent: Sep. 13, 1988

[54] METHOD AND APPARATUS FOR MIXING LIQUIDS

[75] Inventor: Sylvester Bergman, Midland, Mich.

[73] Assignee: The Dow Chemical Company, Midland, Mich.

[21] Appl. No.: 305,748

[22] Filed: Sep. 25, 1981

[51] Int. Cl.⁴ .............................................. F16K 19/00
[52] U.S. Cl. ...................................... 137/1; 137/209;
137/605; 137/624.13; 137/897; 366/167
[58] Field of Search ............. 137/209, 624.13, 624.15,
137/605, 897, 1; 251/331; 366/167, 173

[56] References Cited

U.S. PATENT DOCUMENTS

| | | | |
|---|---|---|---|
| 2,540,523 | 2/1951 | Horn | 137/624.13 |
| 2,768,951 | 10/1956 | Fehlmann | 210/754 |
| 3,061,198 | 10/1962 | Kerr et al. | 137/624.13 |
| 3,351,240 | 11/1967 | Gray | 222/70 |
| 3,369,705 | 2/1968 | Curtis et al. | 222/57 |
| 3,380,462 | 4/1968 | Schieber et al. | 137/209 |
| 3,385,474 | 5/1968 | Roby, Jr. | 222/57 |
| 3,476,128 | 11/1969 | Barker | 137/624.15 |
| 3,598,288 | 8/1971 | Posgate | 222/70 |
| 3,614,263 | 10/1971 | Witt | 137/209 |
| 3,716,346 | 2/1973 | Greene | 137/605 |
| 4,166,084 | 8/1979 | Shea | 261/69 A |
| 4,243,070 | 1/1981 | Jackson | 251/331 |
| 4,281,935 | 8/1981 | Cramer et al. | 137/897 |
| 4,333,833 | 6/1982 | Longley et al. | 210/198.1 |

Primary Examiner—Robert G. Nilson
Attorney, Agent, or Firm—M. B. Lilly

[57] ABSTRACT

Method and apparatus for introducing a first liquid having a high vapor pressure into a second liquid, which comprises maintaining the first liquid under gas pressure in excess of its vapor pressure, and intermittently introducing predetermined quantities of said first liquid under pressure into the second liquid. The pressure of the first liquid remains above its vapor pressure before it is mixed with the second liquid. This method and apparatus is particularly applicable to the introduction of liquid bromine chloride into liquid waste or water.

29 Claims, 2 Drawing Sheets

METHOD AND APPARATUS FOR MIXING LIQUIDS

BACKGROUND OF THE INVENTION

For many years chlorine has been widely used to disinfect water and sewage. Customarily, liquid chlorine is converted to chlorine gas which is then introduced into the stream of water or sewage through a gas injector. Bromine chloride has recently been promoted for similar use, but the mixing of liquid bromine chloride with water in lines away from the main water or sewage stream produced plugging of these lines. Furthermore, flashing or instantaneous evaporation of the liquid bromine chloride in the metering pumps resulted in the stoppage of flow from these pumps. As an additional problem, the introduction of bromine chloride as a gas into the liquid stream to be treated required expensive evaporation equipment and gas injection apparatus.

SUMMARY OF THE INVENTION

The present invention is directed to a method of mixing a first liquid having a vapor pressure substantially in excess of atmospheric pressure with a second liquid, and to apparatus for practicing that method, which comprises intermittently injecting predetermined quantities of the first liquid into a moving stream of the second liquid such that the pressure under which the first liquid is maintained exceeds its vapor pressure until after the first liquid is injected into the second liquid.

BRIEF DESCRIPTION OF THE DRAWING

In order to describe the present invention in more detail, reference is made to accompanying drawings wherein.

DESCRIPTION OF THE PREFERRED EMBODIMENTS

Figure 1:
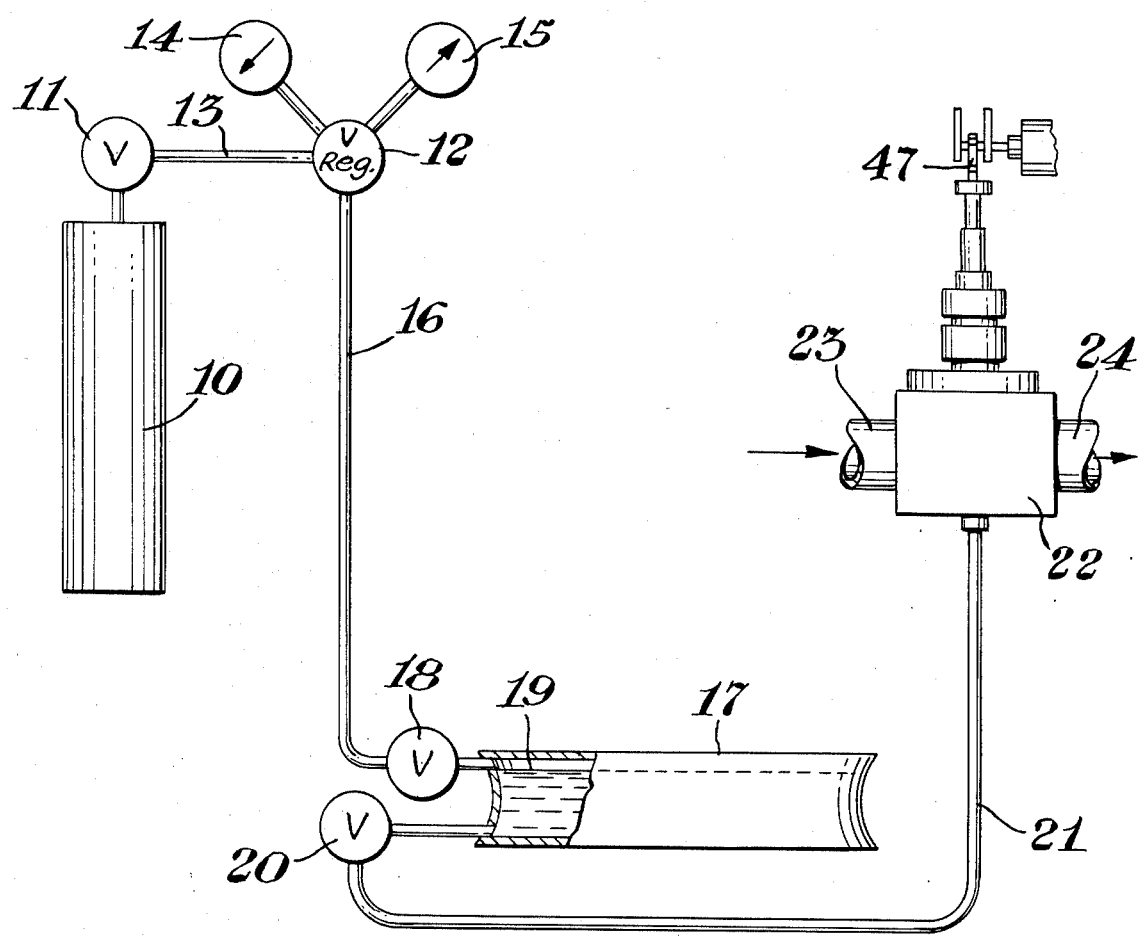
FIG. 1 is a schematic presentation of one embodiment of an apparatus for practicing the present invention.
Figure 3:
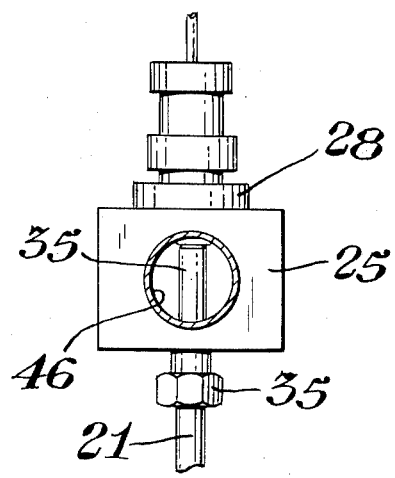
FIG. 3 is a side elevation of the valve body taken on line 3—3 of FIG. 1.

In the schematic presentation shown in FIG. 1, cylinder 10 contains compressed nitrogen gas which may be released from the cylinder by means of valve 11. When valve 11 is opened, liquid nitrogen gas is fed to the regulator 12 through line 13. Gauges 14 and 15 show, respectively, the pressure of the nitrogen in cylinder 10 and the pressure of the nitrogen on the exit side of the regulator 12, namely, line 16. Line 16 connects at the other end to a bromine chloride container 17 through valve 18. Container 17, as shown in the drawing, is a standard shipping cylinder for bromine chloride. In FIG. 1, the bromine chloride fills cylinder 17 up to line 19. Bromine chloride in liquid form is released from container 17 under the pressure of the nitrogen gas through valve 20 and passes through pipe 21 to metering valve 22. The valve can be actuated by a rotating cam 47. Here the liquid bromine chloride is introduced into a flowing stream of water or waste material which comes into the metering valve 22 through inlet pipe 23 and exits through outlet pipe 24. Pipes 23 and 24 are connected to the metering valve in fluid-tight relationship by any suitable means, such as threaded connections 27 and 37 shown in FIG. 2, and form part of a water or liquid waste conduit.

Figure 2:
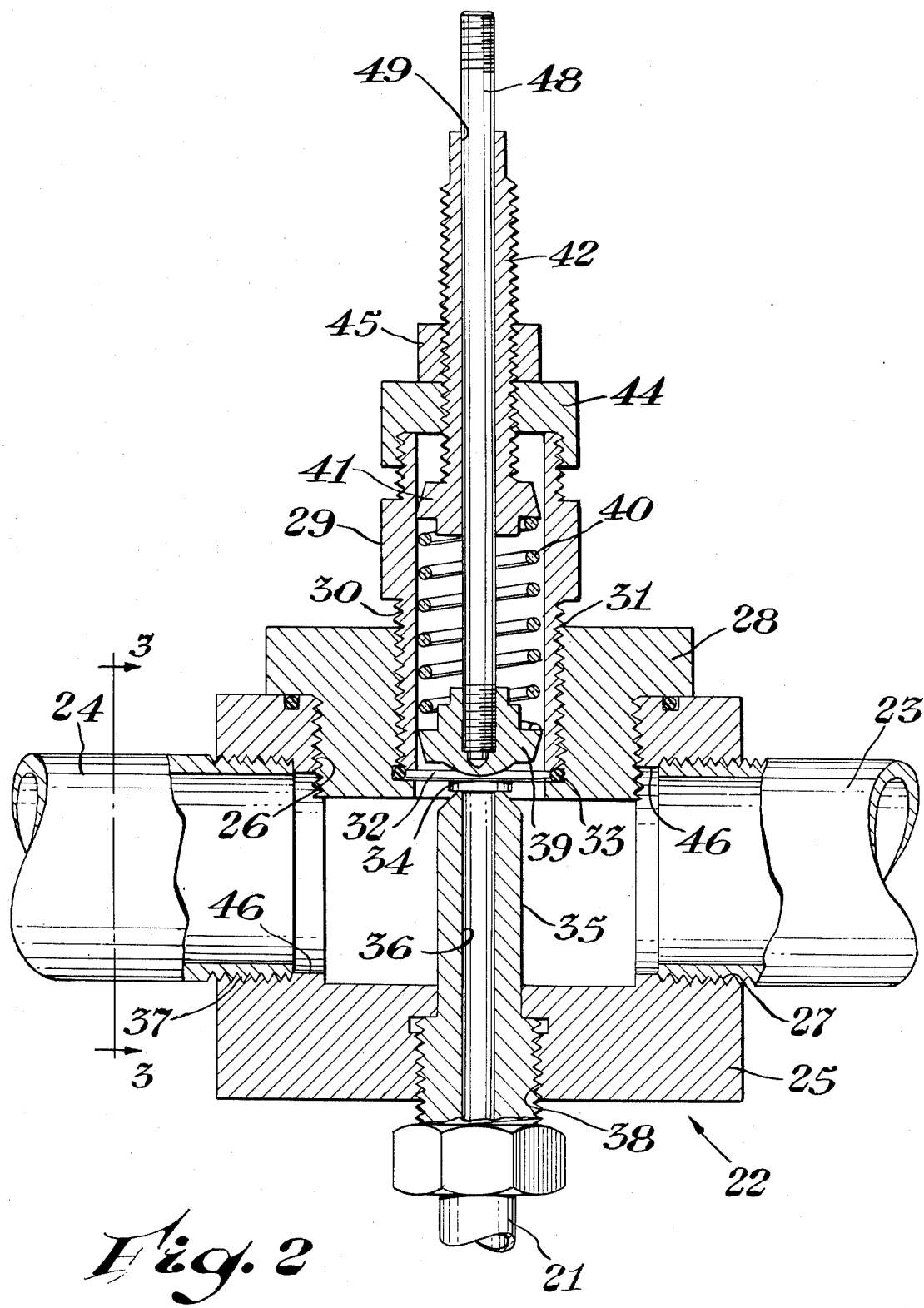
FIG. 2 is an enlarged cross section of the metering valve shown in FIG. 1.

Referring now to FIG. 2, metering valve 22 comprises a valve body 25 having a circular opening 26 in the top portion thereof. A cover block 28 threadedly engages opening 26. Hollow cylindrical member 29 having an external threaded portion 30 is screwed into opening 31, which centrally penetrates cover block 28. A circular, flexible diaphragm 32 is positioned in an annular groove 33 in the cover block 28. Member 29 is screwed into the opening 31 in the cover block 28 until the lower extremity of member 29 bears against diaphragm 32 with sufficient pressure to provide a liquid tight seal.

A seating cushion 34 is glued or otherwise attached to the diaphragm 32 and is designed to seat against valve seat 35 and to cover one end of an opening 36 which extends centrally through valve seat 35. This valve seat 35 is threadedly positioned in opening 38 in the lower part of valve body 25. The pipe 21 which feeds liquid bromine chloride under pressure to the metering valve 22 is connected with the lower end of the opening 36 so as to fill opening 36 with liquid bromine chloride.

A compression head 39 is urged by spring 40 against the upper side of diaphragm 32 so as to force the seating cushion 34 against valve seat 35. The amount of pressure exerted by spring 40 may be varied by raising or lowering a spring seat member 41 formed on the lower end of an externally threaded sleeve member 42, which in turn threadedly engages cap block 44 attached to member 29. A lock nut 45 holds sleeve member 42 in fixed position when it is tightened down against cap block 44.

The water or waste inlet 23 and outlet 24 are threadedly connected at either side of the valve body 25 to the passageway 46 which extends through the entire valve body 25 in, for example, a generally horizontal direction.

The metering of the liquid bromine chloride into the liquids flowing through passageway 46 is achieved by means of a control rod 48 which is slidably positioned within an aperture 49 extending through sleeve 42 and threadedly engaging at its lower end the compression head 39. Suitable means (not shown) are provided for pulling the control rod upwardly against the compression of spring 40 for varying periods of time and at varying frequencies. Means for moving control rod 48 in a predetermined manner include electronic, hydraulic and cam and pinion. It is essential that the movement of the control rod upwardly and downwardly be at a rate such that the pressure on the liquid bromine chloride in the opening 36 does not fall below the vapor pressure of the liquid bromine chloride.

In the operation of the apparatus shown in the accompanying drawings, valve 11 is opened and regulator 12 is adjusted until the gauge 15 shows the desired pressure. When the liquid in container 17 is liquid bromine chloride, the pressure on gauge 15, assuming operation at or near room temperature of 70° F., should be regulated to between about 50 and about 100 pounds per square inch (psi). Preferably, this pressure should be substantially in excess of the vapor pressure of liquid in cylinder 17 (e.g., 20 psi higher), so that with bromine chloride this pressure preferably is about 50 to 80 psi. Valve 18 of the cylinder 17 is opened and this creates a pressure of gaseous nitrogen over the liquid bromine in the cylinder 17 as shown on gauge 15. The vapor pressure at room temperature of liquid bromine chloride is 30 psi. Liquid bromine chloride is released from container 17 through valve 20 and passes through pipe 21 and opening 36 to the seating cushion 34. The pressure of the spring 40 is adjusted so that no liquid bromine chloride is released into the passageway 46 until the control rod 48 is lifted upwardly. When control rod 48 is moved upwardly, the compression head 39 moves upwardly and away from diaphragm 32, and the seating cushion 34 moves upwardly and away from valve seat 35 and opening 36 so that liquid bromine chloride then flows into the passageway 46.

In one embodiment of the invention, a rotating cam contacts a nut adjustably positioned on the control rod 48, so as to intermittently lift the control rod 48. Thus, liquid bromine is introduced in frequent, short spurts into passageway 46. The flow of water or waste material through the passageway 46 immediately moves the liquid bromine chloride away from the valve seat 35 so that there is no build up of insoluble materials near the seating cushion 34. At the same time, the pressure from the nitrogen gas maintains the liquid bromine chloride under a pressure in excess of its vapor pressure so that no vaporization of bromine chloride takes place in opening 36 or line 21. The pressure from the spring 40 urges the seating cushion 34 against the valve seat 35 and over the opening 36 so as to prevent any back flow of liquid from the passageway 46. In this manner, the pressure imposed on the liquid bromine chloride exceeds its vapor pressure until such time as it is mixed with the water or waste material in passageway 46.

The method and apparatus comprising the present invention was employed over a period of several weeks in a small pilot plant, during which time the apparatus shown in the drawings was calibrated. In starting up the apparatus, the valve 11 of container 10 (containing compressed nitrogen gas under 2500 psi) was opened to register the full pressure on gauge 14. The regulator 12 was opened until gauge 15 read 80 psi. Valve 18 was then opened so that the nitrogen gas passed into cylinder 17 to pressurize the bromine chloride therein to 80 psi. Water was then passed through passageway 46 at 22 psi and at a rate of flow of approximately 20 gallons per minute. At this time, valve 20 was opened and bromine chloride fed through pipe 21 and opening 36 and into pressurized contact with seating cushion 34.

The control rod 48 was lifted intermittently (approximately 84 times per minute) by means of a cam rotated by an electric motor operating at 1700 rpm and bearing against a pinion positioned on rod 48. The pinion was mounted on screw threads on rod 48 so that the height of the lift of the rod 48 could be adjusted simply by screwing the pinion upwardly or downwardly on the rod 48. For metering purposes, the height of lift of rod 48 translates into the wideness of the opening between the seating cushion 34 and valve seat 35.

Over a period of several weeks, the apparatus was operated at several lift heights for several hours and the following data were obtained:

| Lift Height Mils (.001 inch) | Pounds of BrCl Fed Per Day |
|---|---|
| 25 | 720 |
| 50 | 1,420 |
| 75 | 1,960 |
| 100 | 2,100 |
| 125 | 2,560 |
| 150 | 2,680 |

| Lift Height Mils (.001 inch) | Pounds of BrCl Fed Per Day |
|---|---|
| 170 | 2,920 |

Some 12,000 pounds of bromine chloride passed through the apparatus. During the several weeks of test operation, no clogging of the bromine chloride lines occurred during this entire time and the valve seat and surrounding passageway remained clear of any deposits.

It will be apparent to those skilled in the art that all parts of the apparatus that come into contact with liquid bromine chloride are preferably substantially nonreactive with this chemical. One such material that has been found to be satisfactory is polyvinylidene fluoride. Other materials that are essentially nonreactive with bromine chloride may, of course, be employed. The seating cushion 34 is desirable because the diaphragm 32 must be flexible and, thus, is quite thin. Although shown as a separate, circular disk, the seating cushion can be formed integrally with the diaphragm 32.

Another variation which may be employed in practicing the present invention is to use a metering pump to intermittently force the liquid bromine chloride against the spring-held seating cushion with sufficient pressure to unseat the cushion from the valve seat 35. Again, this particular procedure will produce the introduction of liquid bromine chloride into the water or waste stream in intermittent, short spurts. Care must be taken, however, so that vaporization of the liquid bromine chloride does not occur in the suction stroke of the metering pump.

It will be apparent that while the method and apparatus herein described had been discussed in detail with respect to the use of liquid bromine chloride, the present invention is applicable to the introduction or mixing of any liquid having a vapor pressure substantially in excess of atmospheric pressure (e.g., 15 to 20 psi above atmospheric) with a second liquid. Examples of liquids having a high vapor pressure include ammonia, sulfur dioxide and chlorine. The use of compressed nitrogen gas has been specifically described above, but it will be apparent to those skilled in the art that other gases under pressure that are inert or nonreactive with the liquid to be injected can be similarly employed. For example, dry air, argon and helium can be employed quite satisfactorily for maintaining a sufficiently high pressure over the liquid bromine chloride or other liquid in container 17.

What is claimed is:

1. Apparatus for mixing a first liquid with a second liquid which comprises:
   a metering valve body having a passageway therethrough for the second liquid,
   a valve seat located within said passageway and having an opening extending therethrough,
   a diaphragm positioned in contact with said valve seat and over one end of the opening therein,
   means for urging the diaphragm against the valve seat so as to effect a fluid-tight closure over the opening therein, and
   means for intermittently removing the diaphragm from said valve seat so as to permit a predetermined amount of said first liquid to pass into the passageway.

2. Apparatus for mixing a first liquid with a second liquid which comprises:
   a source for the first liquid,
   a metering valve body having a passageway therethrough for the second liquid,
   means connecting said passageway with a source of the second liquid,
   a valve seat located within said passageway and having an opening extending therethrough,
   means for conducting the first liquid from its source to and through said opening,
   a diaphragm positioned in contact with said valve seat and over one end of the opening therein,
   means for urging the diaphragm against the valve seat so as to effect a fluid-tight closure over the opening therein, and
   means for intermittently removing the diaphragm from said valve seat so as to permit a predetermined amount of said first liquid to pass into the passageway.

3. Apparatus as defined in claim 2 wherein the source for the first liquid includes means for maintaining said first liquid under pressure.

4. Apparatus as defined in claim 3 where the pressure means is a compressed gas.

5. Apparatus for mixing a first liquid with a second liquid, which comprises:
   a reservoir for the first liquid,
   a conduit for the second liquid,
   a metering valve positioned in said conduit,
   means for conducting the first liquid from the reservoir to the metering valve,
   means for maintaining said first liquid under pressure in the reservoir and throughout the conducting means,
   said metering valve comprising means for intermittently injecting the first liquid under pressure into the second liquid in short spurts of predetermined amounts.

6. Apparatus for mixing bromine chloride with an aqueous liquid in measured amounts which comprises:
   a container for holding a reservoir of liquid bromine chloride;
   means for maintaining a gaseous atmosphere in the container at a pressure substantially in excess of the vapor pressure of liquid bromine chloride;
   a conduit for the aqueous liquid;
   a metering valve comprising:
   a valve body having a passageway therethrough for aqueous liquid;
   means connecting said passageway for the aqueous liquid with the aqueous liquid conduit;
   a valve seat located within said passageway for the aqueous liquid and having an opening extending therethrough;
   means for conducting liquid bromine chloride from said container to one end of the opening in said valve seat;
   a diaphragm;
   means in said valve body for positioning said diaphragm over the other end of the opening in said valve seat;
   means for holding said diaphragm in pressurized contact against said valve seat over the opening in said valve seat so that no liquid bromine is released into the passageway for the aqueous liquid; and
   means for intermittently removing the diaphragm from contact with said valve seat, so that predetermined amounts of the liquid bromine chloride are intermittently injected in short spurts into the passageway for the aqueous liquid.

7. A method of mixing a first liquid having a vapor pressure substantially in excess of atmospheric pressure with a second liquid, which comprises intermittently injecting predetermined quantities of the first liquid into a moving stream of the second liquid in short spurts such that the pressure under whioh the first liquid is maintained exceeds its vapor pressure until after said first liquid is injected into said second liquid.

8. A method as defined in claim 7 wherein the first liquid is injected into the stream of second liquid in short, intermittent spurts.

9. A method as defined in claim 7 wherein compressed gas is employed to inject said first liquid into said second liquid.

10. A method as defined in claim 7 wherein the first liquid is bromine chloride and the second liquid is an aqueous liquid.

11. A method as defined in claim 9 wherein the compressed gas is nitrogen.

12. A method for introducing a first liquid having a vapor pressure substantially in excess of atmospheric pressure into a second liquid, which comprises maintaining a source of the first liquid under pressure substantially in excess of its vapor pressure, and intermittently injecting the first liquid from the pressurized source into a moving stream of the second liquid in intermittent spurts while maintaining the pressure on the first liquid until its injection into the second liquid.

13. Apparatus for mixing a first liquid with a second liquid which comprises:
   a metering valve body having a passageway therethrough for the second liquid,
   a valve seat located within said passageway and having an opening extending therethrough,
   a flexible sealing means positioned in contact with said valve seat and over one end of the opening therein,
   means for urging the flexible seal against the valve seat so as to effect a fluid-tight closure over the opening therein, and
   means for intermittently removing the flexible seal from said valve seat so as to permit a predetermined amount of said first liquid to pass into the passageway.

14. Apparatus for mixing a first liquid with a second liquid which comprises:
   a source for the first liquid,
   a metering valve body having a passageway therethrough for the second liquid,
   means connecting said passageway with a source of the second liquid,
   a valve seat located within said passageway and having an opening extending therethrough,
   means for conducting the first liquid from its source to and through said opening,
   a flexible sealing means positioned in contact with said valve seat and over one end of the opening therein,
   means for urging the flexible seal against the valve seat so as to effect a fluid-tight closure over the opening therein, and
   means for intermittently removing the flexible seal from said valve seat so as to permit a predetermined amount of said first liquid to pass into the passageway.

15. Apparatus as defined in claim 14 wherein the source for the first liquid includes means for maintaining said first liquid under pressure.

16. Apparatus for mixing a first liquid with a vapor substantially in excess of atmospheric pressure with a second liquid in measured amounts which comprises:
a container for holding a reservoir of the first liquid;
means for maintaining a gaseous atmosphere in the container at a pressure substantially in excess of the vapor pressure of the first liquid;
a conduit for the second liquid;
a metering valve comprising:
a valve body having a passageway therethrough for the second liquid;
means connecting said passageway for the second liquid with the first liquid conduit;
a valve seat located within said passageway for the second liquid and having an opening extending therethrough;
means for conducting the first liquid from said container to one end of the opening in said valve seat;
a flexible sealing means in said valve body positioned over the other end of the opening in said valve seat;
means for holding said flexible seal in pressurized contact against said valve seat over the opening in said valve seat so that no first liquid is released into the passageway for the second liquid; and
means for intermittently removing the flexible seal from contact with said valve seat, so that predetermined amounts of the first liquid are intermittently injected in short spurts into the passageway for the second liquid.

17. A method as defined in claim 7 wherein the first liquid is selected from the group consisting of bromine chloride, ammonia, sulfur dioxide and chlorine.

18. A method as defined in claim 17 wherein the second liquid includes water.

19. A method as defined in claim 7 wherein the first liquid has a vapor pressure in excess of 15 pounds per square inch above atmospheric pressure.

20. A method as defined in claim 12 wherein the first liquid is selected from the group consisting of bromine chloride, ammonia, sulfur dioxide and chlorine.

21. A method as defined in claim 20 wherein the second liquid includes water.

22. A method as defined in claim 12 wherein the first liquid has a vapor pressure in excess of 15 pounds per square inch above atmospheric pressure.

23. A method of mixing a first fluid having a vapor pressure greater than atmospheric pressure with a second fluid, comprising the steps of:
forming a stream of said second fluid,
conducting said first fluid to a release location in said stream under a transfer pressure greater than said vapor pressure, and
periodically releasing said first fluid in intermittent spurts, each of a controlled duration, into said second fluid stream without substantially vaporizing at said release location,
whereby the first and second fluids are mixed in the liquid state.

24. Apparatus for mixing a first fluid having a vapor pressure greater than atmospheric pressure with a second fluid, comprising:
means for forming a stream of said second fluid,
means for conducting said first fluid to a release location in said stream under a transfer pressure greater than said vapor pressure, and
means for periodically releasing said first fluid in intermittent spurts, each of a controlled duration, into said second fluid stream without substantially vaporizing at said release location,
whereby the first and second fluids are mixed in the liquid state.

25. The apparatus of claim 1 wherein the valve seat extends diametrically through the passageway and a seating cushion is attached to the diaphragm and adapted to seal the valve seat opening by means of a rod and a spring element exerting pressure on a surface of the diaphragm opposite to the seating cushion.

26. A method for mixing two liquids comprising:
a. passing a first liquid under a positive pressure from a first liquid source to a metering valve with a passageway therethrough for a second liquid;
b. passing the the second liquid through the passageway in the metering valve;
c. mixing the first liquid with the second liquid, in liquid phases, by passing the first liquid through a valve seat extending diametrically through the passageway, the first liquid intermittently flowing from the valve seat directly into the second liquid in the passageway through a valve seat opening;
d. said intermittent flow being affected by intermittently removing and replacing a seating cushion on the opening in the valve seat, the seating cushion being adapted to prevent flow of the first liquid from the valve seat opening when the seating cushion contacts the valve seat under pressure, the pressure being applied by means of a spring element in operative combination with a rod so positioned to apply the pressure to the seating cushion through a diaphragm attached to the seating cushion, the diaphragm being adapted to prevent contact between the first and second liquids and the rod and spring element.

27. The method of claim 26 including intermittently lifting the rod to remove pressure from the seating cushion by means of a cam in operative combination with the rod.

28. The method of claim 26 including intermittently removing and replacing the seating cushion to introduce the first liquid into the second liquid in intermittent, short spurts.

29. The method of claim 28 wherein the first liquid is bromine chloride.

* * * * *